(12) United States Patent
Saeed et al.

(10) Patent No.: US 12,347,992 B2
(45) Date of Patent: Jul. 1, 2025

(54) INSTALLATION ACCESSORIES FOR LINEMAN HOT STICKS

(71) Applicant: Hubbell Incorporated, Shelton, CT (US)

(72) Inventors: Dana Khalid Saeed, Lewisville, TX (US); Connor Allen Urbeck, Manchester, MO (US)

(73) Assignee: Hubbell Incorporated, Shelton, CT (US)

( * ) Notice: Subject to any disclaimer, the term of this patent is extended or adjusted under 35 U.S.C. 154(b) by 743 days.

(21) Appl. No.: 17/011,073

(22) Filed: Sep. 3, 2020

(65) Prior Publication Data

US 2021/0075173 A1   Mar. 11, 2021

Related U.S. Application Data

(60) Provisional application No. 62/896,890, filed on Sep. 6, 2019.

(51) Int. Cl.
| | | |
|---|---|---|
| *H01R 43/00* | (2006.01) | |
| *B25B 13/50* | (2006.01) | |
| *B25B 23/08* | (2006.01) | |
| *H02G 1/02* | (2006.01) | |

(Continued)

(52) U.S. Cl.
CPC .............. *H01R 43/00* (2013.01); *B25B 13/50* (2013.01); *B25B 23/08* (2013.01); *H02G 1/02* (2013.01); *B25B 23/10* (2013.01); *B25B 23/12* (2013.01)

(58) Field of Classification Search
CPC ......... H01R 43/00; H01R 11/11; H01R 11/12; H01R 11/14; H01R 11/15; H01R 31/00; H01R 31/02; H01R 31/006; H02G 1/02; H02G 7/00; H02G 7/053; H02G 7/20;

(Continued)

(56) References Cited

U.S. PATENT DOCUMENTS

| | | | |
|---|---|---|---|
| 1,920,168 A | | 8/1933 | Bodendieck |
| 1,987,584 A | * | 1/1935 | Bodendieck ........... H01R 11/15 439/480 |

(Continued)

FOREIGN PATENT DOCUMENTS

KR       20180038818       *    4/2018

OTHER PUBLICATIONS

International Search Report dated Nov. 23, 2020 in corresponding international application PCT/US2020/049113.

(Continued)

*Primary Examiner* — Robert J Scruggs
(74) *Attorney, Agent, or Firm* — Ruggiero McAllister & McMahon LLC

(57) ABSTRACT

A hot stick installation accessory is provided. The accessory includes a main housing, a base, and a tool. The main housing has a holding region that holds an electrical component. The base can be removably secured to a body of the hot stick. The base is connected to the main housing for rotation about an axis parallel to the hot stick. The tool is secured to the base so that the tool moves along the axis and is operative alignment with a first area of the holding region. The tool is securable to a hook of the hot stick so that rotation of the hot stick, and thus of the hook, results in rotation of the tool with respect to the main housing.

15 Claims, 6 Drawing Sheets

(51) Int. Cl.
*B25B 23/10* (2006.01)
*B25B 23/12* (2006.01)

(58) Field of Classification Search
CPC ......... B25B 13/50; B25B 23/08; B25B 23/10;
B25B 23/12; B23P 19/00
USPC .......................................................... 81/53.1
See application file for complete search history.

(56) References Cited

U.S. PATENT DOCUMENTS

| | | | | |
|---|---|---|---|---|
| 2,002,981 A | * | 5/1935 | Halladay | H01R 43/00 |
| | | | | 81/55 |
| 2,605,661 A | * | 8/1952 | Heuer | H01R 11/15 |
| | | | | 439/477 |
| 2,966,817 A | * | 1/1961 | Wengen | H01R 11/14 |
| | | | | 81/53.1 |
| 2,983,053 A | | 5/1961 | Bartholomew et al. | |
| 2,986,053 A | * | 5/1961 | Atman | H01R 11/15 |
| | | | | 439/781 |
| 3,600,784 A | | 8/1971 | Propst | |
| 4,846,725 A | * | 7/1989 | Williams | H01R 11/15 |
| | | | | 24/135 R |
| 7,666,024 B2 | | 2/2010 | De France | |
| 10,361,493 B2 | | 7/2019 | De France | |
| 2005/0247166 A1 | * | 11/2005 | Sasaki | B23P 19/06 |
| | | | | 81/54 |

OTHER PUBLICATIONS

Written Opinion dated Nov. 23, 2020 in corresponding international application PCT/US2020/049113.

* cited by examiner

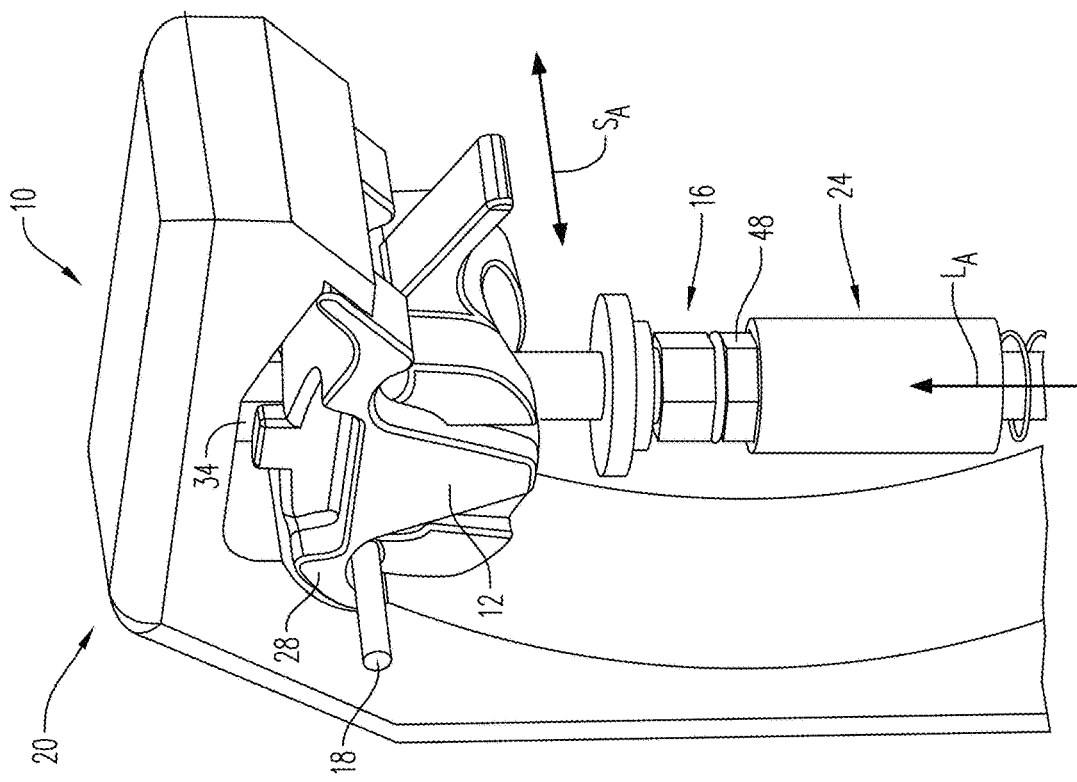
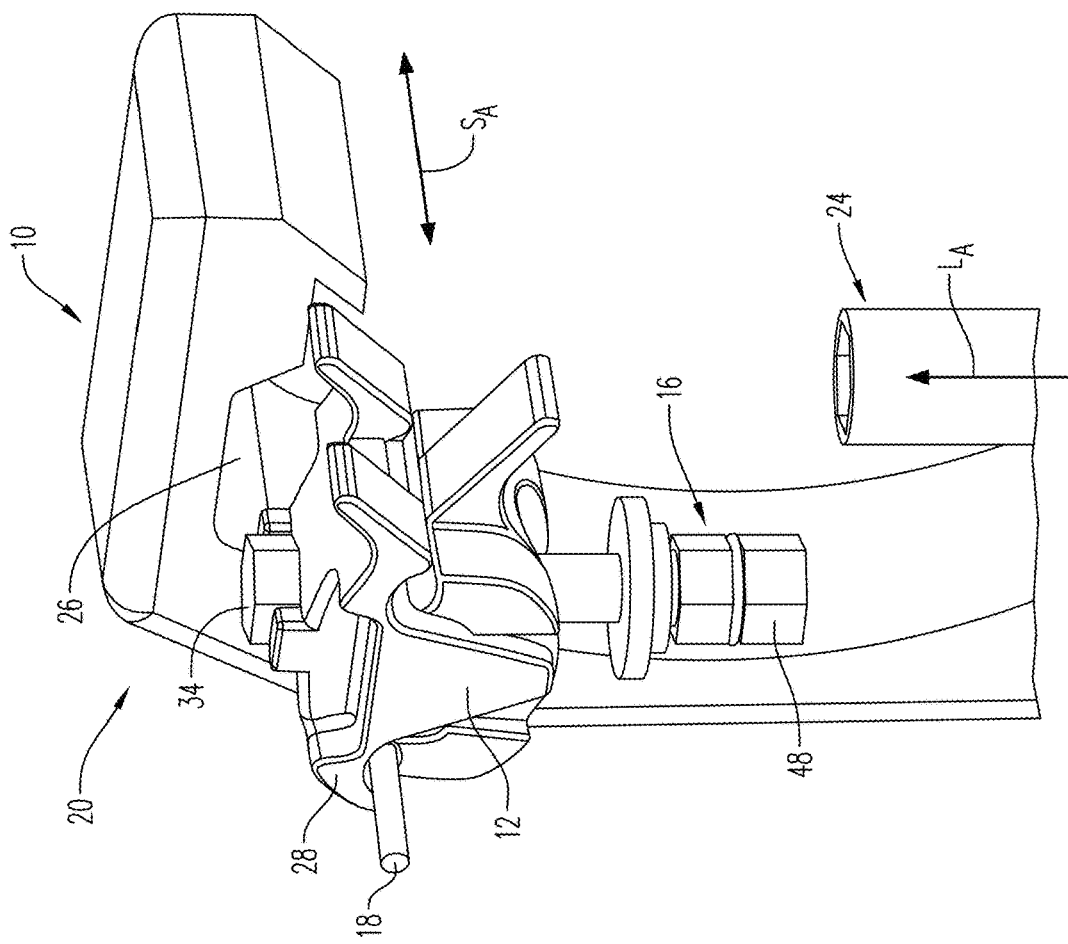

INSTALLATION ACCESSORIES FOR LINEMAN HOT STICKS

CROSS REFERENCE TO RELATED APPLICATIONS

This application claims the benefit of U.S. Provisional Application 62/896,890 filed Sep. 6, 2019, the contents of which are incorporated by reference herein.

BACKGROUND

1. Field of the Invention

The present disclosure is related to lineman hot sticks. More particularly, the present disclosure is related to installation accessories for lineman hot sticks that allow for installation of components onto overhead power distribution lines.

2. Description of Related Art

Spring-loaded hot sticks for manipulating various electrical components are known and are described in the prior art such as, but not limited to, U.S. Pat. Nos. 1,920,168 and 3,600,784, which are incorporated by reference herein. Hot sticks allow linemen to engage overhead power distribution lines, which can increase the safety of the linemen.

One electrical component that linemen often connect to overhead power distribution lines are known as spring-loaded parallel pad clamp connectors. These clamp connectors are described in the prior art such as, but not limited to, Applicant's own U.S. Pat. No. 7,666,024, which is also incorporated by reference herein.

It has been proposed to modify the clamp connector so that they can be installed using a hot stick as described in Applicant's own U.S. Pat. No. 10,361,493.

However, it has been determined by the present application that there is a need for accessories that allow for the installation of electrical components using lineman hot sticks.

SUMMARY

A hot stick installation accessory is provided. The accessory includes a main housing, a base, and a tool. The main housing has a holding region that holds an electrical component. The base can be removably secured to a body of the hot stick. The base is connected to the main housing for rotation about an axis parallel to the hot stick. The tool is secured to the base so that the tool moves along the axis and is operative alignment with a first area of the holding region. The tool is securable to a hook of the hot stick so that rotation of the hot stick, and thus of the hook, results in rotation of the tool with respect to the main housing.

In some embodiments either alone or together with any one or more of the aforementioned and/or after-mentioned embodiments, the holding region includes a bolt head holding area operatively aligned with the tool.

In some embodiments either alone or together with any one or more of the aforementioned and/or after-mentioned embodiments, the tool is a socket.

In some embodiments either alone or together with any one or more of the aforementioned and/or after-mentioned embodiments, the socket is spring biased along the axis towards the main housing.

In some embodiments either alone or together with any one or more of the aforementioned and/or after-mentioned embodiments, the socket includes a connector that selectively secures the socket to a bolt of the electrical component.

In some embodiments either alone or together with any one or more of the aforementioned and/or after-mentioned embodiments, the connector is a set screw, a magnet, an adhesive, and any combinations thereof.

In some embodiments either alone or together with any one or more of the aforementioned and/or after-mentioned embodiments, the tool is securable to the hook of the hot stick so that movement of the hook along the axis results in movement of the tool along the axis.

In some embodiments either alone or together with any one or more of the aforementioned and/or after-mentioned embodiments, the base has a compression connection.

In some embodiments either alone or together with any one or more of the aforementioned and/or after-mentioned embodiments, the main housing has two or more holding regions each having the first area.

In some embodiments either alone or together with any one or more of the aforementioned and/or after-mentioned embodiments, the main housing is rotatable with respect to the tool to selectively orient the first area each of the two or more holding regions in operative alignment with the tool.

In some embodiments either alone or together with any one or more of the aforementioned and/or after-mentioned embodiments, the main housing is rotatable with respect to the tool about the axis to selectively orient the first area each of the two or more holding regions in operative alignment with the tool.

In some embodiments either alone or together with any one or more of the aforementioned and/or after-mentioned embodiments, the main housing is rotatable with respect to the tool about another axis that is perpendicular to the axis to selectively orient the first area each of the two or more holding regions in operative alignment with the tool.

In some embodiments either alone or together with any one or more of the aforementioned and/or after-mentioned embodiments, the hot stick installation accessory further includes a second tool secured to the base so that the tool moves along the axis and is operative alignment with a second area of the holding region.

In some embodiments either alone or together with any one or more of the aforementioned and/or after-mentioned embodiments, the second tool is securable to the hook so that movement of the hook along the axis results in movement of the second tool along the axis with respect to the second area of the main housing.

In some embodiments either alone or together with any one or more of the aforementioned and/or after-mentioned embodiments, the holding region is adjustable to between a first size and a second size, the first size being larger than the electrical component and the second size securing the electrical component.

In some embodiments either alone or together with any one or more of the aforementioned and/or after-mentioned embodiments, the holding region has a release that moves the holding region from to the second size to the first size.

A hot stick installation accessory is provided that includes a main housing, a base, and a tool. The main housing has a holding region that holds an electrical component. The base can be removably secured to a body of the hot stick. The tool is secured to the base so that the tool moves along an axis parallel to the hot stick and so that the tool is in operative alignment with a first area of the holding region. The tool can be secured to a hook of the hot stick so that movement of the hook along the axis results in movement of the tool along the axis.

In some embodiments either alone or together with any one or more of the aforementioned and/or after-mentioned embodiments, the holding region is adjustable to between a first size and a second size, the first size being larger than the electrical component and the second size securing the electrical component.

In some embodiments either alone or together with any one or more of the aforementioned and/or after-mentioned embodiments, the holding region includes a release that moves the holding region from to the second size to the first size.

The above-described and other features and advantages of the present disclosure will be appreciated and understood by those skilled in the art from the following detailed description, drawings, and appended claims.

BRIEF DESCRIPTION OF THE DRAWINGS

FIG. 1 is a perspective view of an exemplary embodiment of a hot stick installation accessory according to the present disclosure prior to securing a component therein;

FIG. 2 is a perspective view of the hot stick installation accessory having a component secured therein;

DETAILED DESCRIPTION

Figure 4:
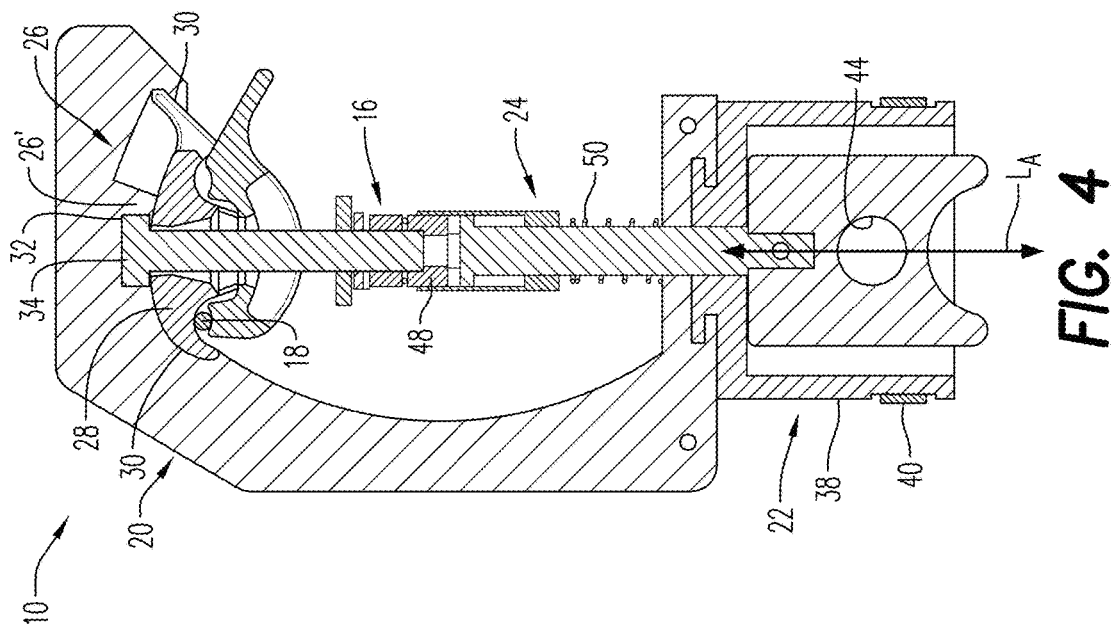
FIG. 4 is a sectional side view of the hot stick installation accessory of FIG. 2.

Referring to the drawings and in particular to FIGS. 1-6, an exemplary embodiment of a hot stick installation accessory is shown and is generally referred to by reference numeral 10. Advantageously, accessory 10 is configured for use with a lineman hot stick to allow the user to install an electrical component 12 on an energized overhead line or main conductor 14 using the hot stick.

Accessory 10 is disclosed herein with electrical component 12 being illustrated as a spring-loaded parallel pad clamp connector having a bolted connection 16 that secures a load or tap conductor 18 to energized line conductor 14. Of course, it is contemplated by the present disclosure for accessory 10 to find use with any other electrical components 12 that have a bolted connection 16. For example, accessory 10 can find use with electrical component 12 with bolted connection 16 such as line dampers, clamping insulators, bolted wedge connector, and others.

Accessory 10 includes a main housing 20, a base 22, and a tool 24. Tool 24 is illustrated as a socket for operatively engaging bolted connection 16 as will be described in detail herein below Main housing 20 has a holding region 26 that is sized and shaped to removably receive and hold component 12 therein. Region 26 is configured to allow component 12 to be laterally installed into and removed from main housing 20, namely along a side axis ($S_A$).

In some embodiments, holding region 26 includes one or more areas 30 (two shown) that hold an upper jaw 28 of component 12 and another area 32 that holds a bolt head 34 of the component. Here, area 32 can be operatively aligned with tool 24. In some embodiments, main housing 20 includes a stopping feature 26' that prevents electrical component 12 from passing through holding region 26 along the side axis ($S_A$).

Base 22 is configured to removably secure accessory 10 to a body 36 of a hot stick. Base 22 can have any connection that prevents rotation of the base with respect to body 36 of the hot stick about a longitudinal axis ($L_A$) and prevents the base from moving along the longitudinal axis ($L_A$).

In some embodiments, base 22 has a compression connector that includes a deflection region 38 and a compression band 40. During installation of accessory 10 to a hot stick, deflection region 38 is placed over body 36 of the hot stick and then compression band 40 is tightened to deflect the region onto the body. To remove accessory 10, compression band 40 is loosened to allow deflection region 38 to be withdrawn from body 36.

Main housing 20 is secured to base 22 in any manner that allows rotation of main housing and base with respect to one another about longitudinal axis ($L_A$), but prevents the main housing and base from moving with respect to one another along the longitudinal axis ($L_A$). In some embodiments best seen in FIGS. 5-6, base 22 has a rim 40 captured by a shoulder 42 of main housing 20.

Tool 24 is secured to base 22 so that the tool moves along longitudinal axis ($L_A$) and is operative alignment with a bolt holding area 32 of main housing 20. Additionally, tool 24 includes an opening 44 that is securable to a hook 46 of the hot stick.

When tool 24 is received on bolted connection 16 and head 34 is received in area 32, rotation of body 36 of the hot stick about longitudinal axis ($L_A$) results in base 22 rotating with respect to main housing 20 so that the bolted connection is tightened or loosened, respectively.

In some embodiments, tool 24 includes a spring 50 that normally biases the tool along longitudinal axis ($L_A$) towards bolt holding area 32.

In embodiments where bolted connection 16 includes a shear nut 48, the shear nut can fracture when a desired torque is reached to prevent the user from over tightening the bolted connection.

The installation and use of accessory 10 are described in more detail below with reference to FIGS. 1-6.

During installation of accessory 10, deflection region 38 of base 22 is placed over body 36 of a hot stick and hook 46 is placed in opening 44 of tool 24. Compression band 40 is then tightened.

Next, electrical component 12 is installed on load conductor 18 by opening the electrical component and placing the load conductor therein. Once load conductor 18 is installed, electrical component 12 is laterally installed into holding region 26 of main housing 20 along the side axis ($S_A$). Here, upper jaw 28 of component 12 is received on areas 30 and bolt head 34 is received in area 32.

Figure 3:
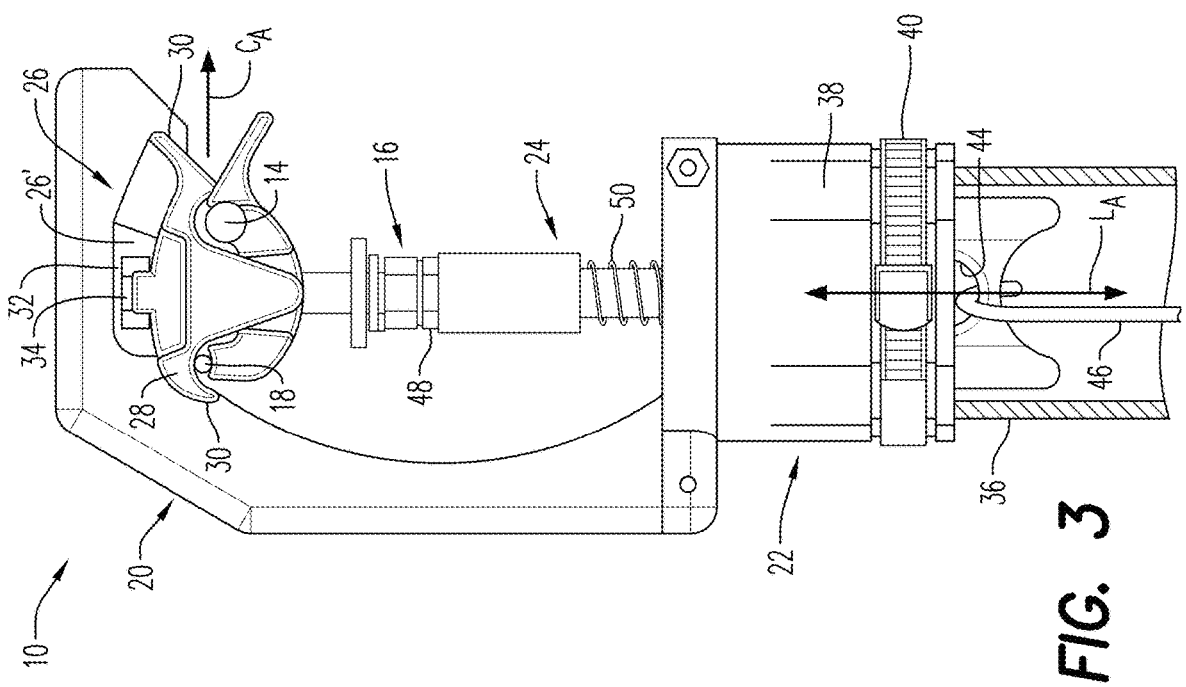
FIG. 3 is a side view of the hot stick installation accessory of FIG. 2.
Figure 6:
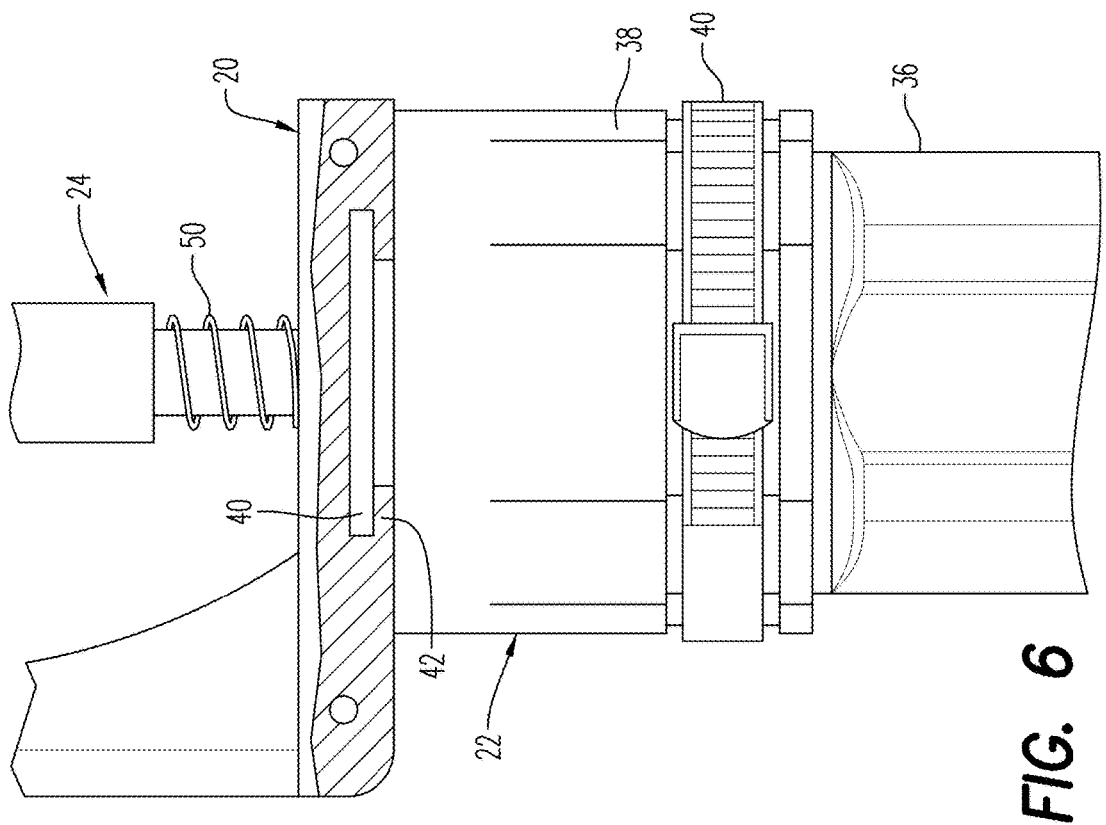
FIG. 6 is a magnified side view of the hot stick installation accessory of FIG. 2.
Figure 5:
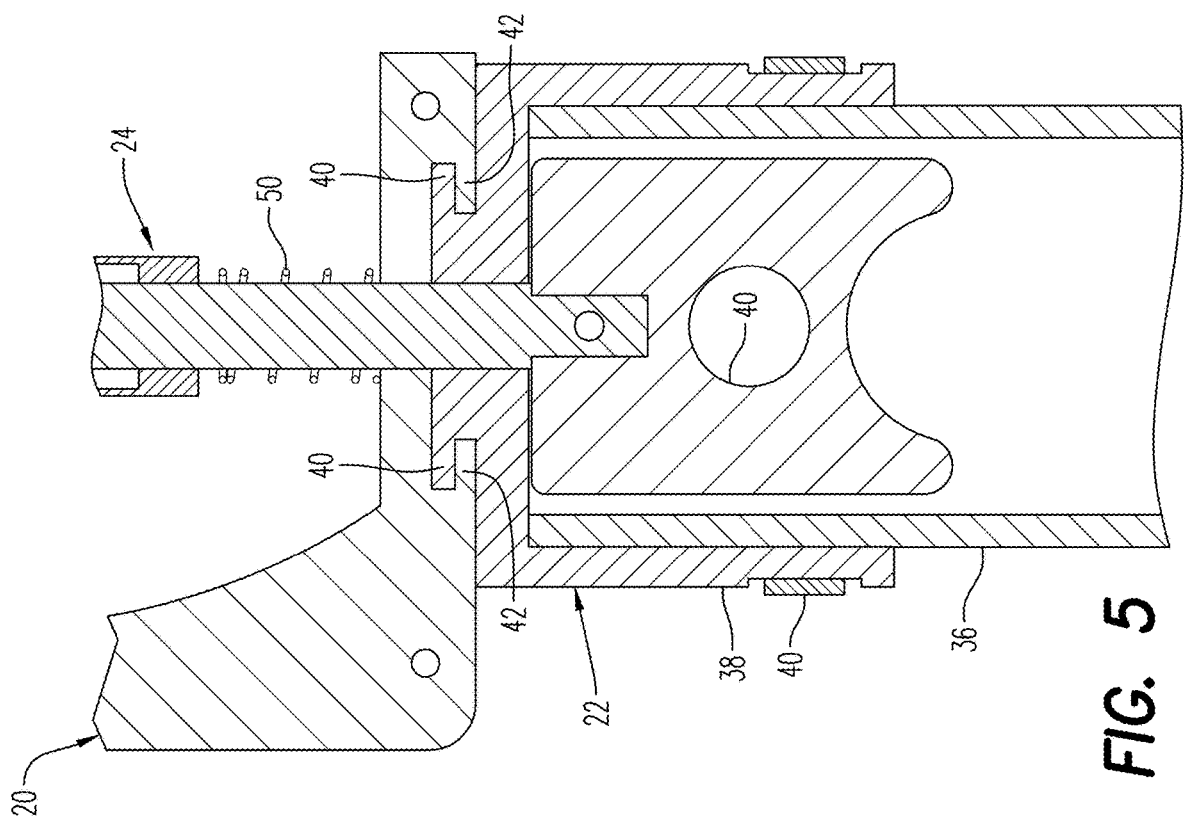
FIG. 5 is a magnified sectional side view of the hot stick installation accessory of FIG. 2.

During side installation of electrical component 12, tool 24 is moved downwards along longitudinal axis ($L_A$) as seen in FIG. 1. Once electrical component 12 is in main housing 12, tool 24 is moved upwards along longitudinal axis ($L_A$) so that the tool is operatively engaged with bolted connection 16 as seen in FIG. 2-3.

The hot stick is then used to move the accessory 10 having electrical component 12 with load conductor 18 next to overhead line conductor 14. Electrical component 12 is pushed onto line conductor 14 along connecting axis ($C_A$) until the line conductor is installed in the electrical component as seen in FIG. 3.

The hot stick is rotated about longitudinal axis ($L_A$) so that tool 24 tightens bolted connection 16. While tightening, main housing 20 with electrical component 12 and conductors 14, 18 therein remain stationary, while the base 22 and tool 24 rotates. When shear nut 48 is present, the hot stick is rotated until shear nut 48 fractures from bolted connection 16 at the desired torque level.

Once electrical component 12 has been tightened, hot stick is actuated so that hook 46 moves tool 24 downwards along longitudinal axis ($L_A$) until the tool is free from bolted connection. Then, electrical component 12 is laterally removed from holding region 26 of main housing 20 along side axis ($S_A$).

Accordingly, accessory 10 provides both linear and rotational movement of tool 24 that are needed for the installation of electrical component 12 using a hot stick.

Accessory 10 provides main housing 20 with the capability to have electrical component 12 easily inserted and removed from the side and to hold the electrical component—including bolt head 34—securely in place during installation. Accessory 10 provides tool 24 allows for rotational motion that is needed for turning of bolted connection 16 and also linear motion that is needed for removal from the bolted connection after installation. Accessory 10 provides base 22 that is easily and securely connected to body 36 of the hot stick and enables.

Figure 7:
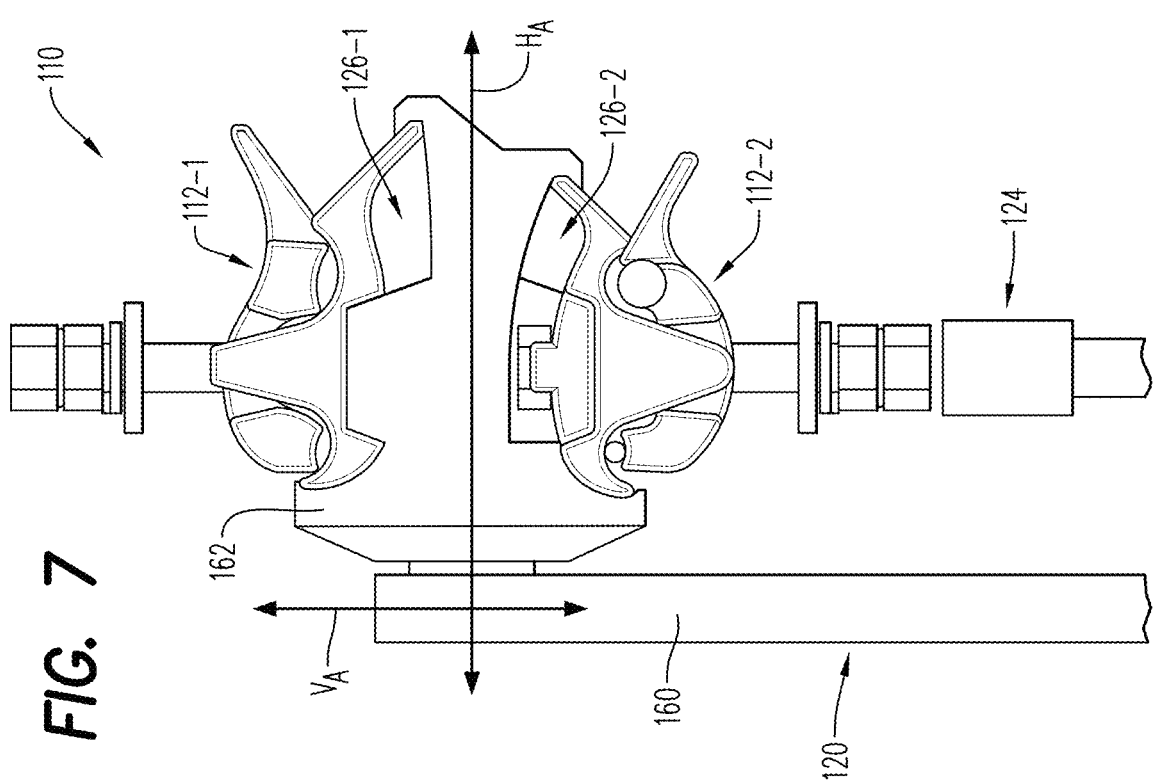
FIG. 7 is a side view of an alternate exemplary embodiment of a hot stick installation accessory according to the present disclosure.

Referring now to FIG. 7, an alternate exemplary embodiment of a hot stick installation accessory according to the present disclosure is shown and is generally referred to by reference numeral 110. In this embodiment, component parts performing similar and/or analogous functions to those discussed with respect to FIGS. 1-6 are labeled in multiples of one hundred.

It has been determined by the present disclosure that accessory 110 can be configured for use with more than one electrical component—where these components can be of the same or different types and/or of the same or differing size.

Here, accessory 110 includes main housing 120 having a first portion 160 and a second portion 162. First portion 160 is secured to the base in the manner discussed above with respect to FIGS. 1-6.

Second portion 162 includes more than one holding region 126-1, 126-2 (two shown) that are configured to removably receive and hold components 112-1, 112-2 therein in the manner discussed above. It should be recognized that second portion 162 is shown byway of example only having two regions 126-1, 126-2. Of course, it is contemplated by the present disclosure for second portion 162 to any desired number of holding regions.

In the illustrated example, holding region 126-2 is configured to use with Hubbell's FASTAP® product number UCT26 that accepts a main and tap conductors in a diameter range of 0.13-0.45", while holding region 126-1 is configured to use with Hubbell's FASTAP® product number UCT32 that accepts a main conductor in a diameter range of 0.29 to 0.73" and the load or tap conductor in a diameter range of 0.13 to 0.56".

Advantageously, first and second portions 160, 162 are secured to one another so that the second portion rotates to operatively align holding regions 126-1, 126-2 with tool 124.

In this manner, accessory 110 can be rotated so that holding region 126-1 is aligned with tool 124 for installation of component 112-1 or can be rotated so that holding region 126-2 is aligned with tool 124 for installation of component 112-2.

It should be recognized that accessory 110 is shown by way of example having first and second portions 160, 162 secured to one another for rotation about a horizontal axis ($H_A$). Of course, it is contemplated by the present disclosure for first and second portions 160, 162 to be secured to one another for rotation about a vertical axis ($V_A$). Moreover, it is contemplated by the present disclosure for main housing 120 to be configured for rotation about both horizontal and vertical axes.

Figure 8:
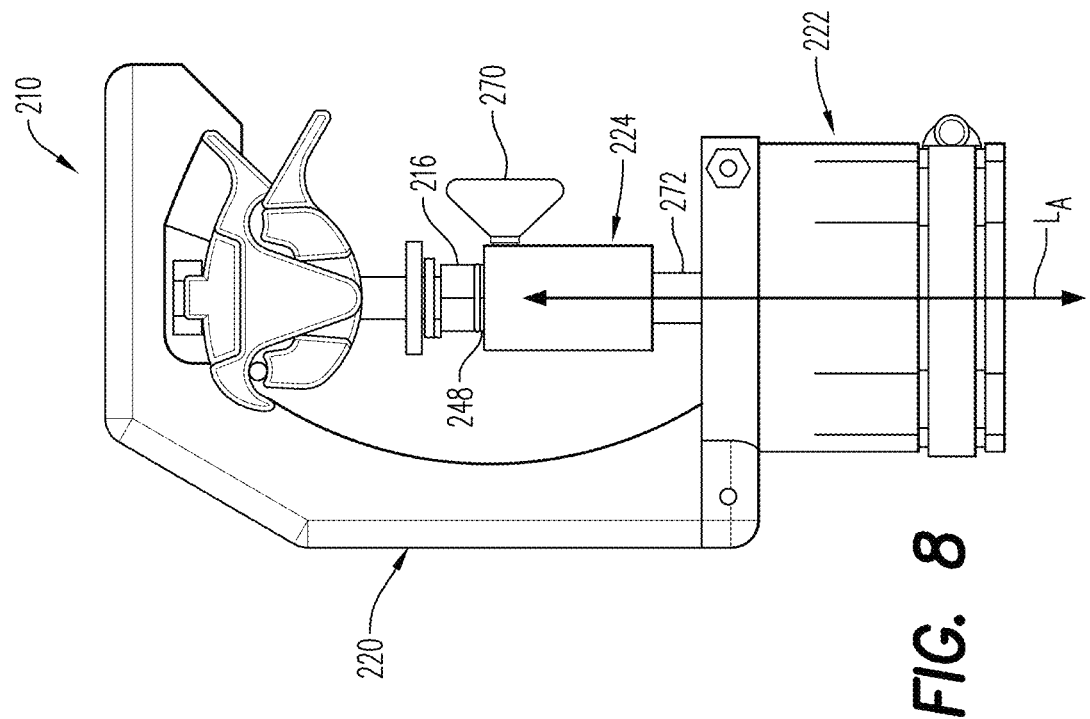
FIG. 8 is a side view of another alternate exemplary embodiment of a hot stick installation accessory according to the present disclosure.

Referring now to FIG. 8, an alternate exemplary embodiment of a hot stick installation accessory according to the present disclosure is shown and is generally referred to by reference numeral 210. In this embodiment, component parts performing similar and/or analogous functions to those discussed with respect to FIGS. 1-6 are labeled in multiples of two hundred.

Accessory 210 includes tool 224 that is secured to shear nut 248 of bolted connection 216. Here, tool 224 can be secured to shear nut 248 by any desired connection 270 such as, but not limited to a set screw, a magnet, an adhesive, and others.

Additionally, accessory 210 can have a base 222 having a fixed shaft 272—namely a shaft that lacks opening 44 and is not connected to hook 46 of the hot stick. Rather, shaft 272 is secured to base 222 so that rotation of the hot stick about longitudinal axis ($L_A$) results in base 222 and tool 224 rotating with respect to main housing 220 so that bolted connection 216 is tightened or loosened, respectively. Tool 224 can move with respect to shaft 272 along the longitudinal axis ($L_A$) but lacks the need for the spring 50 of the previous embodiments.

Figure 10:
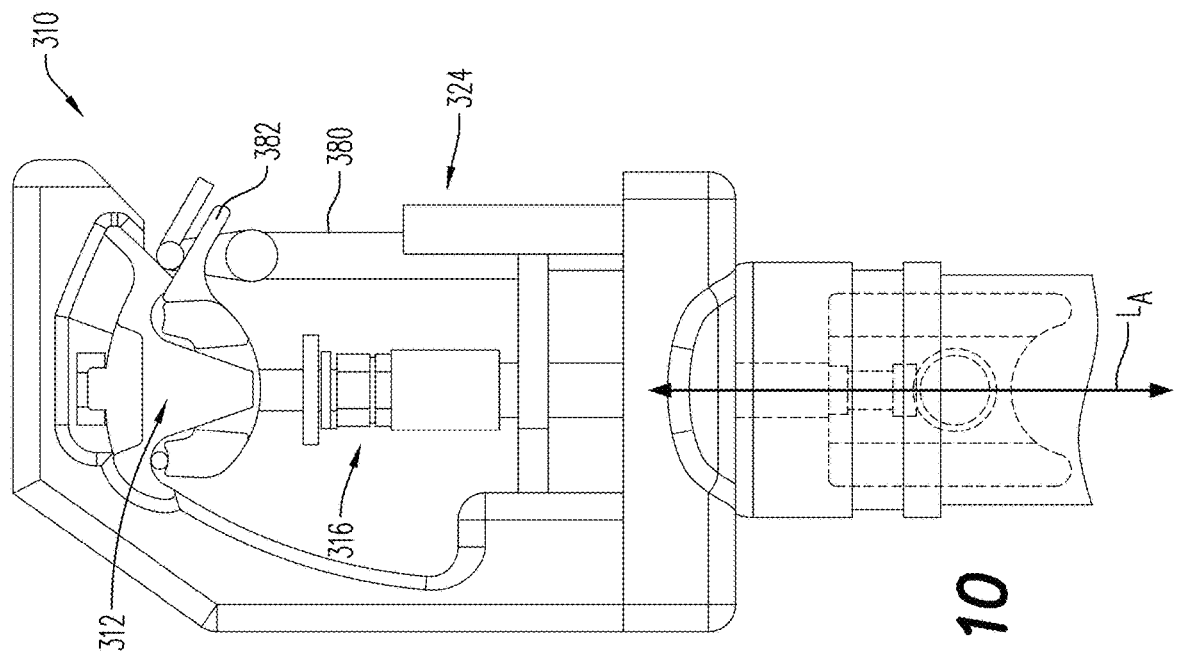
FIG. 10 is a side view of the hot stick installation accessory of FIG. 9.
Figure 9:
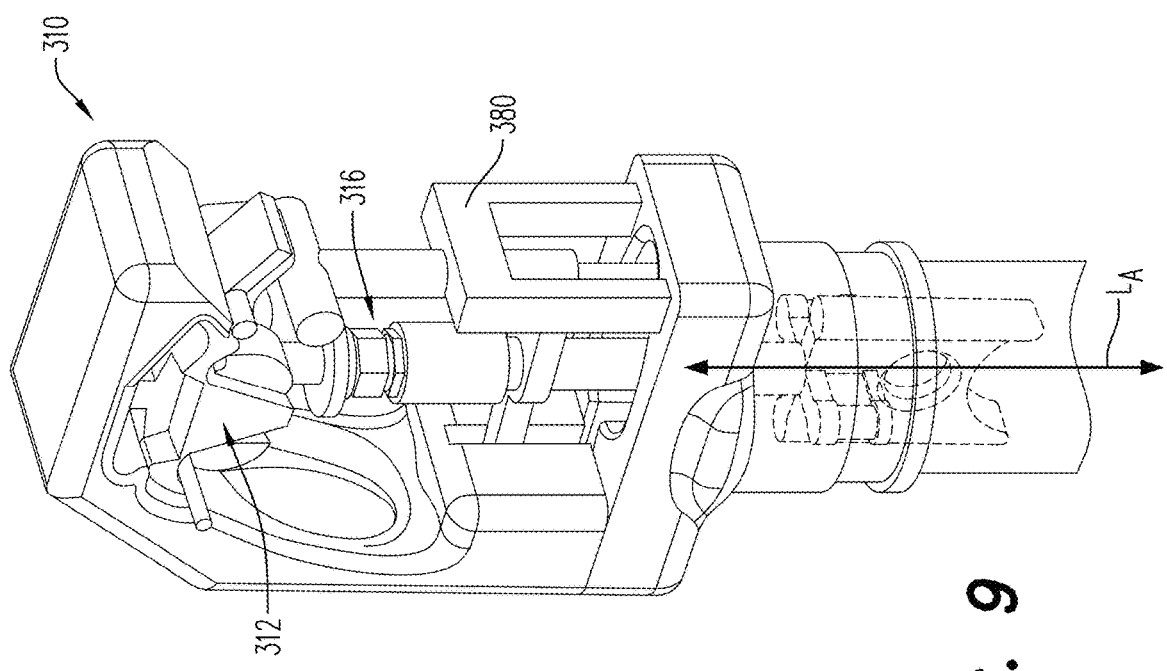
FIG. 9 is a perspective view of yet another alternate exemplary embodiment of a hot stick installation accessory according to the present disclosure.

Referring now to FIGS. 9-10, an alternate exemplary embodiment of a hot stick installation accessory according to the present disclosure is shown and is generally referred to by reference numeral 310. In this embodiment, component parts performing similar and/or analogous functions to those discussed with respect to FIGS. 1-6 are labeled in multiples of three hundred.

In this embodiment, tool 324 further includes a pulling arm 380. Pulling arm 380 is configured to move along longitudinal axis ($L_A$) in response to movement of the hook of the hot stick. Further, pulling arm 380 is operatively connected to a lower jaw 382 of electrical component 312.

In this manner, accessory 310 is configured to allow the user to first open the electrical component 312 by pulling down on the lower jaw 382 via tool 324, before installing the line conductor (not shown) into the electrical component and before tightening bolted connection 316 via the socket, which rotates within pulling arm 380.

Figure 11:
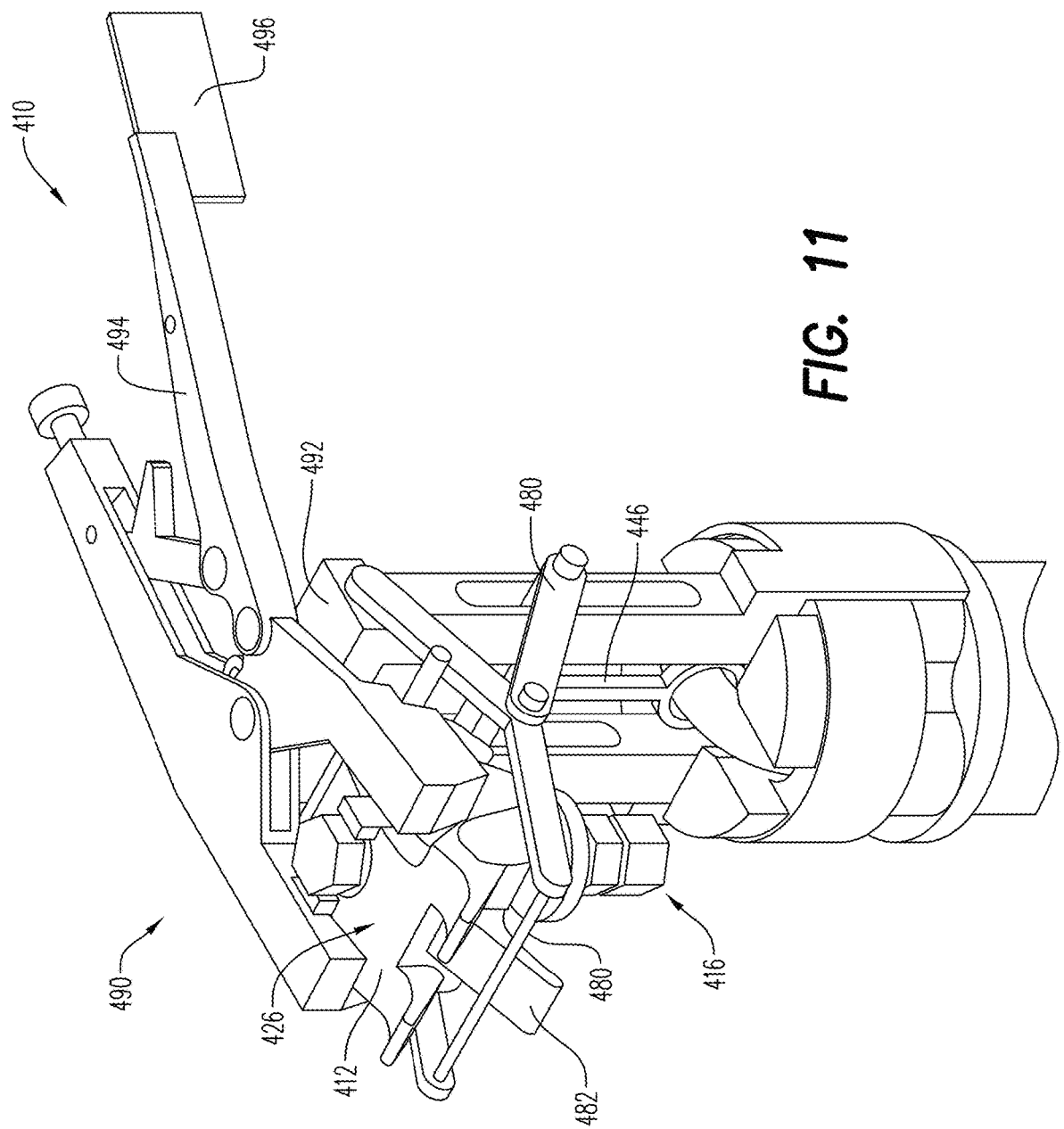
FIG. 11 is a perspective view of still another alternate exemplary embodiment of a hot stick installation accessory according to the present disclosure.

Referring now to FIG. 11, another alternate exemplary embodiment of a hot stick installation accessory according to the present disclosure is shown and is generally referred to by reference numeral 410. In this embodiment, component parts performing similar and/or analogous functions to those discussed with respect to FIGS. 1-6 are labeled in multiples of four hundred.

Accessory 410 includes main housing 420 that has a holding region 426 with an adjustable sized to removably receive and hold component 412. Here, holding region 426 includes a fixed clamp 490, a movable clamp 492, a clamp arm 494, and a clamp release 496 that function similar to a vice grip. Accordingly, holding region 426 can be clamped onto components 412 of differing sizes. Moreover, the clamping function of holding region 426 can be released by contact with release 496.

In this embodiment, tool 424 further includes one or more pulling arms 480. Pulling arms 480 are configured to move along longitudinal axis ($L_A$) in response to movement of hook 446 of the hot stick. Further, pulling arm 480 is operatively connected to a lower jaw 482 of electrical component 412. In the illustrated embodiment, pulling arm 480 is connected to hook 446 via a pulling loop and one or more angled bars (two shown).

However in this embodiment, the tightening of bolted connection 416 and release of clamping release 496 would require a second hot stick to be used.

Accordingly and as described herein, the accessories allow—while the electrical component is installed on the overhead conductors via the hot stick—rotational movement and/or linear movement via the tool to assist in the installation of the component.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A hot stick installation accessory, comprising:
   a main housing having a holding region, the holding region being configured to hold an upper side of an electrical component and having a first area configured to hold a first portion of a bolted connection at the upper side of the electrical component;
   a base configured to be removably secured to a body of the hot stick, the base being connected to the main housing for rotation about an axis parallel to the hot stick; and
   a tool secured to the base so that the tool moves along the axis and is operatively engageable with a second portion at a lower side of the bolted connection, the tool being securable to a hook of the hot stick so that rotation of the hook of the hot stick, and thus of the hook, results in rotation of the tool with respect to the main housing to tighten or loosen the bolted connection.

2. The hot stick installation accessory of claim 1, wherein the tool is a socket.

3. The hot stick installation accessory of claim 2, wherein the socket is spring biased along the axis towards the main housing.

4. The hot stick installation accessory of claim 2, wherein the socket comprises a connector, the connector being configured to selectively secure the socket to the second portion of the bolted connection.

5. The hot stick installation accessory of claim 4, wherein the connector is selected from a group consisting of a set screw, a magnet, an adhesive, and any combinations thereof.

6. The hot stick installation accessory of claim 1, wherein the tool is securable to the hook of the hot stick so that movement of the hook along the axis results in movement of the tool along the axis.

7. The hot stick installation accessory of claim 1, wherein the base comprises a compression connection.

8. The hot stick installation accessory of claim 1, wherein the main housing has two or more holding regions each having the first area.

9. The hot stick installation accessory of claim 8, wherein the main housing is rotatable with respect to the tool to selectively orient the first area each of the two or more holding regions in operative alignment with the tool.

10. The hot stick installation accessory of claim 9, wherein the main housing is rotatable with respect to the tool about the axis to selectively orient the first area each of the two or more holding regions in operative alignment with the tool.

11. The hot stick installation accessory of claim 9, wherein the main housing is rotatable with respect to the tool about another axis that is perpendicular to the axis to selectively orient the first area each of the two or more holding regions in operative alignment with the tool.

12. The hot stick installation accessory of claim 1, further comprising a second tool secured to the base so that the tool moves along the axis and is operative alignment with a second area of the holding region.

13. The hot stick installation accessory of claim 12, wherein the second tool is securable to the hook so that movement of the hook along the axis results in movement of the second tool along the axis with respect to the second area of the main housing.

14. The hot stick installation accessory of claim 1, wherein the holding region is adjustable to between a first size and a second size, the first size being larger than the electrical component and the second size securing the electrical component.

15. The hot stick installation accessory of claim 14, wherein the holding region comprises a release, the release being configured to move the holding region from to the second size to the first size.

* * * * *